United States Patent
Miller et al.

(10) Patent No.: US 10,558,731 B2
(45) Date of Patent: Feb. 11, 2020

(54) FLAME INSTABILITY MONITORING WITH DRAFT PRESSURE AND PROCESS VARIABLE

(71) Applicant: Rosemount Inc., Shakopee, MN (US)

(72) Inventors: John Philip Miller, Ardmore, OK (US); Joseph H. Sharpe, Glen Allen, VA (US)

(73) Assignee: ROSEMOUNT INC., Chanhassen, MN (US)

( * ) Notice: Subject to any disclaimer, the term of this patent is extended or adjusted under 35 U.S.C. 154(b) by 710 days.

(21) Appl. No.: 14/031,537

(22) Filed: Sep. 19, 2013

(65) Prior Publication Data

US 2014/0088918 A1 Mar. 27, 2014

Related U.S. Application Data

(60) Provisional application No. 61/703,977, filed on Sep. 21, 2012.

(51) Int. Cl.
*G06F 17/18* (2006.01)
*G01M 99/00* (2011.01)

(52) U.S. Cl.
CPC ............. *G06F 17/18* (2013.01); *G01M 99/00* (2013.01)

(58) Field of Classification Search
CPC ........... G06F 17/18; F23N 5/00; G01M 99/00
See application file for complete search history.

(56) References Cited

U.S. PATENT DOCUMENTS

| | | | |
|---|---|---|---|
| 3,849,061 A | 11/1974 | Summer | |
| 4,253,404 A | 3/1981 | Leonard | |
| 5,160,259 A | 11/1992 | O'Hara et al. | |
| 7,536,274 B2 | 5/2009 | Heavner, III et al. | |
| 7,950,919 B2 | 5/2011 | Johnson et al. | |
| 8,011,921 B2 | 9/2011 | Kim | |
| 8,109,758 B2 | 2/2012 | Kim | |
| 8,469,700 B2 | 6/2013 | Peluso et al. | |
| 2003/0059730 A1* | 3/2003 | Sigafus | F23N 1/002 431/18 |
| 2005/0267709 A1* | 12/2005 | Heavner, III | G05B 23/024 702/183 |
| 2005/0267710 A1 | 12/2005 | Heavner, III et al. | |

(Continued)

FOREIGN PATENT DOCUMENTS

| | | |
|---|---|---|
| CN | 1954277 | 4/2007 |
| CN | 101111726 | 1/2008 |

(Continued)

OTHER PUBLICATIONS

Notification of Transmittal of the International Search Report and the Written Opinion of the International Searching Authority, or the Declaration dated Feb. 28, 2014 in related PCT Application No. PCT/US2013/060615, filed Sep. 15, 2013. 12 pgs.

(Continued)

*Primary Examiner* — Janet L Suglo
(74) *Attorney, Agent, or Firm* — Westman, Champlin & Koehler, P.A.

(57) ABSTRACT

A furnace is monitored by monitoring a statistical variable calculated from a draft measurement and monitoring a process variable related to the operation of the furnace. An abnormal operation of the furnace is determined based upon the statistical variable and the process variable.

19 Claims, 9 Drawing Sheets

(56) References Cited

U.S. PATENT DOCUMENTS

| | | | |
|---|---|---|---|
| 2008/0082295 | A1 | 4/2008 | Kant et al. |
| 2010/0151397 | A1* | 6/2010 | Farrell .................. F23N 5/08 431/4 |
| 2014/0039833 | A1 | 2/2014 | Sharpe, Jr. et al. |

FOREIGN PATENT DOCUMENTS

| | | |
|---|---|---|
| GB | 2 390 675 A | 1/2004 |
| JP | 2008501186 A1 | 1/2008 |
| JP | 2010-506269 | 2/2010 |
| WO | WO 2008042780 A2 | 4/2008 |
| WO | WO 2011117896 A1 | 9/2011 |

OTHER PUBLICATIONS

Communication pursuant to Rule 161(1) and 162 EPC from European Patent Application No. 13770795.6, dated Jun. 11, 2015, 2 pages.
Office Action from Canadian Patent Application No. 2,885,163, dated Feb. 23, 2016.
Office Action from Chinese Patent Application No. 201380038686.7, dated Dec. 23, 2015.
"Abnormal Situation Prevention Through Smart Field Devices", by E. Eryurek et al., NPRA Hydrocarbon Processing, Mar. 2006, pp. 41-48.
"Furnace Flame Instability Detection with Advanced Pressure Diagnostics", by J. Miller, 10 AICHE Spring Meeting, San Antonio, TX.
"Furnace Flame Instability Detection with Advanced Pressure Diagnostics", by J. Miller, 8 pgs.
"Furnace Flame Instability Detection with Advanced Pressure Diagnostics", by J. Miller, Technical Note—Communicate, 00840-0500-4801, Rev AA, Jul. 2010.
Office Action from Chinese Application No. 201380038686.7, dated Jul. 5, 2016.
Office Action from Japanese Application No. 2015-533181, dated May 27, 2016.
Office Action from Chinese Application No. 201380038686.7, dated Dec. 2, 2016.
First Examination report from Australian Application No. 2013318020, dated Apr. 15, 2016.
Australian Examination Report, dated Dec. 22, 2016, 4 pages.
Canadian Examination Report, dated Dec. 12, 2016, 4 pages.
Reexamination Notice from Chinese Patent Application No. 201380038686.7, dated Apr. 27, 2018.
Communication from European Patent Application No. 13770795.6, dated May 4, 2018.
Office Action/Examination Report from Indian Patent Application No. 221/MUMNP/2015, dated Oct. 30, 2018.
Communication from European Patent Application No. 13770795.6, dated Sep. 26, 2019.
Reexamination Notice from Chinese Patent Application No. 201380038686.7, dated Dec. 15, 2017.
Office Action from Chinese Patent Application No. 201811404479.X, dated Nov. 29, 2019.

* cited by examiner

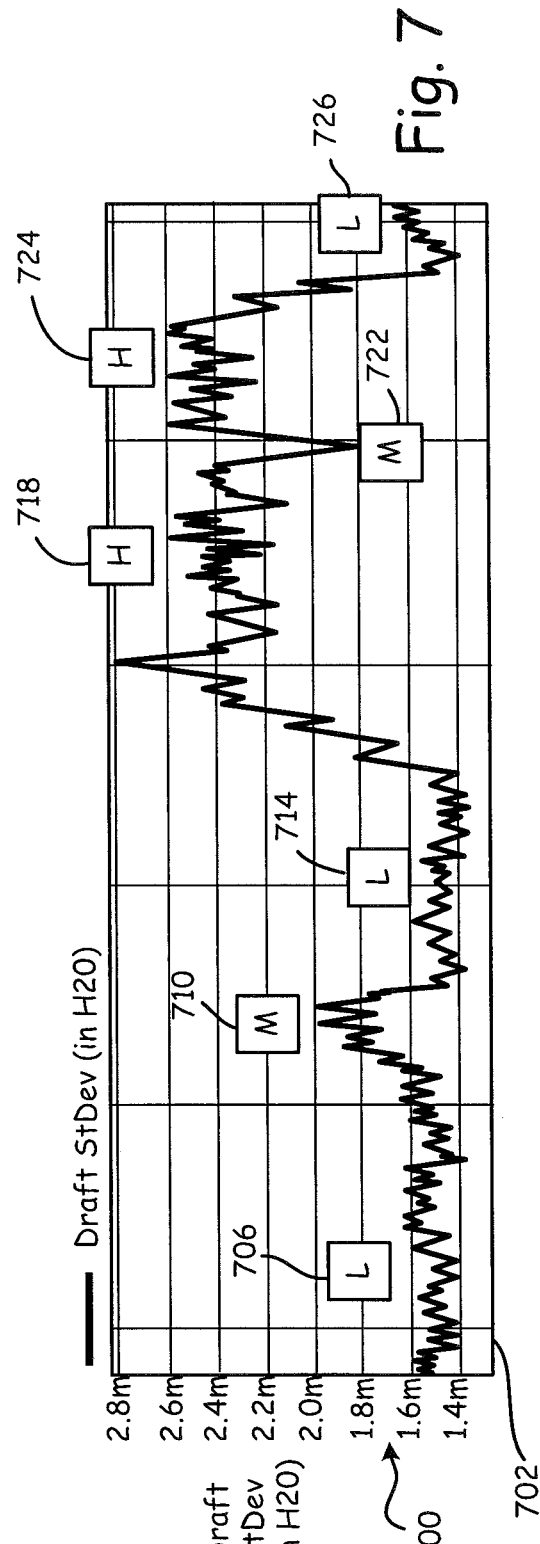
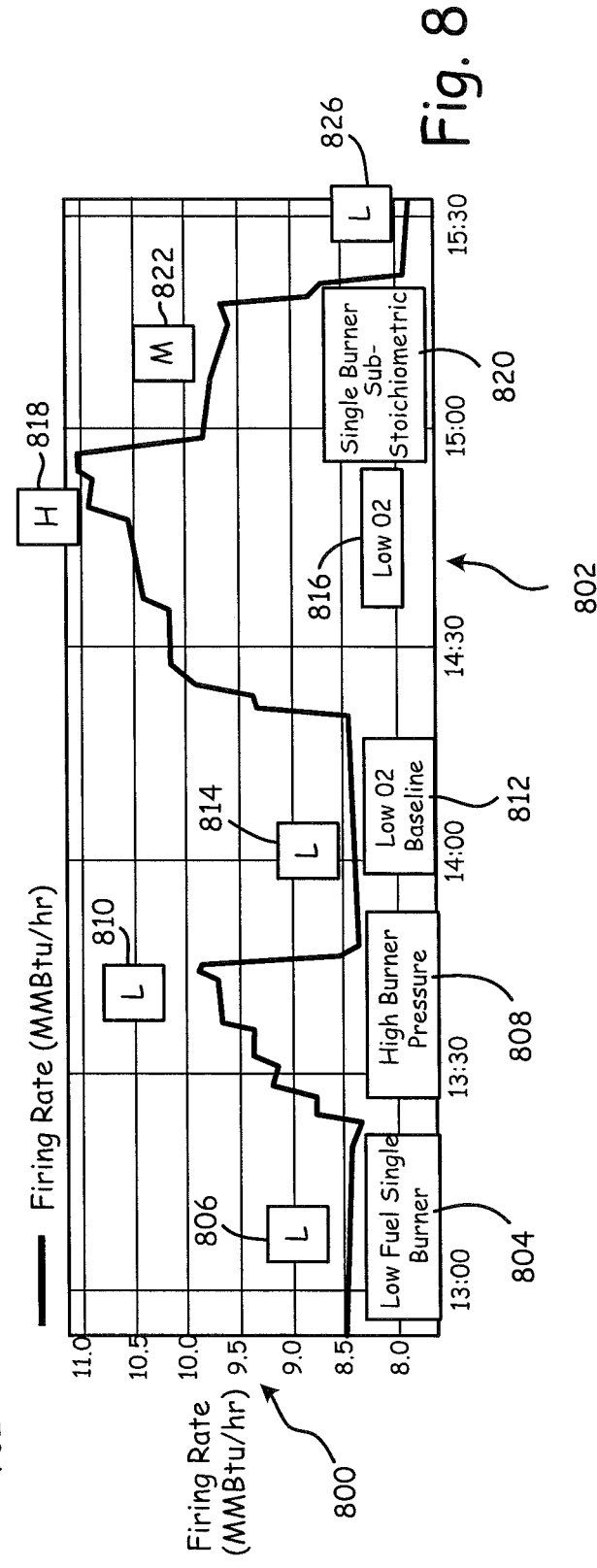

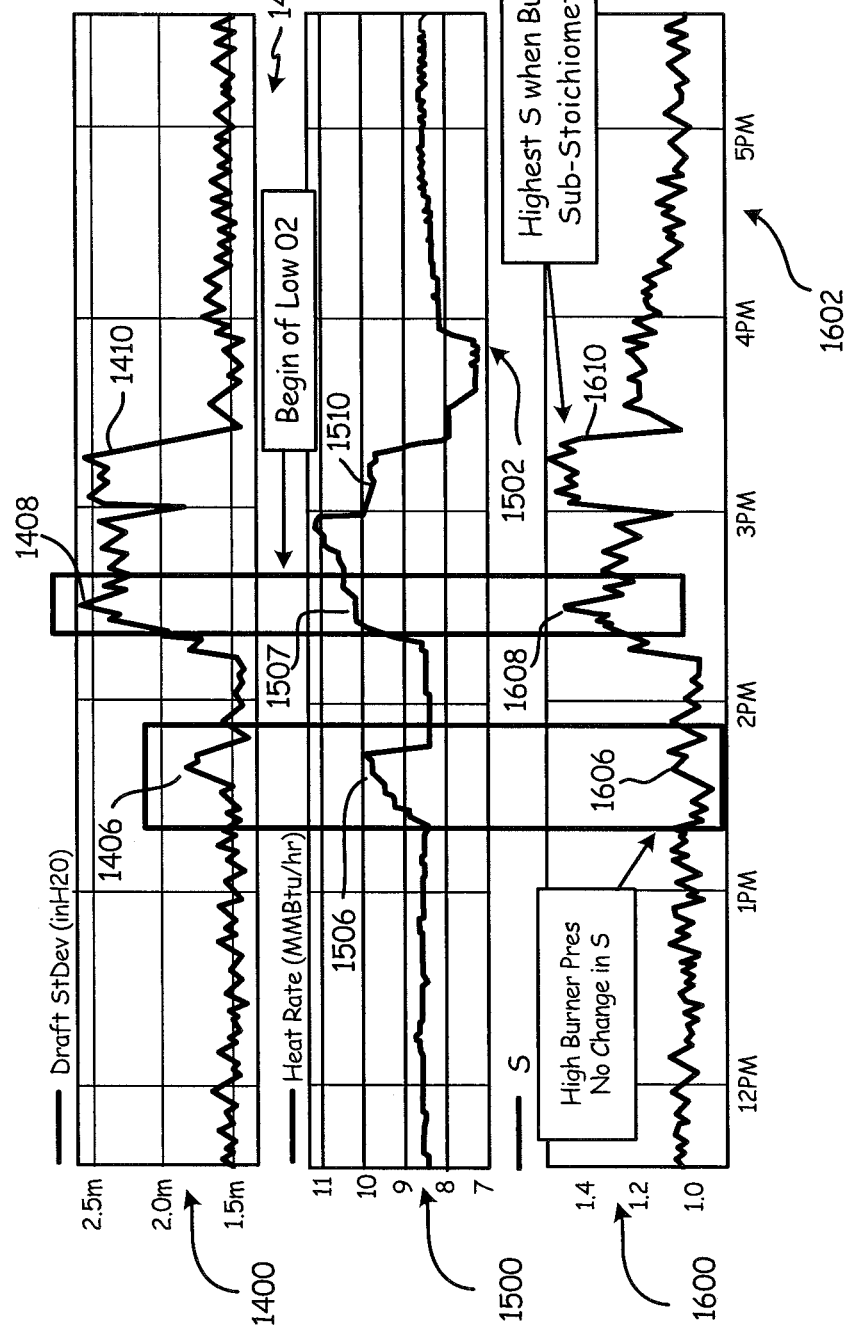

FLAME INSTABILITY MONITORING WITH DRAFT PRESSURE AND PROCESS VARIABLE

CROSS-REFERENCE TO RELATED APPLICATION

The present application is based on and claims the benefit of U.S. provisional patent application Ser. No. 61/703,977, filed Sep. 21, 2012, the content of which is hereby incorporated by reference in its entirety.

FIELD OF THE DISCLOSURE

The present disclosure relates to process control systems. In particular, the present disclosure relates to statistical process monitoring.

BACKGROUND

In processing plants, burners are used to heat process fluids and to burn off waste gas. Such burners generate one or more flames within a firebox using a fuel gas and a source of oxygen such as air. Changes in the quantity or quality of the fuel gas, such as changes in the BTU content of the fuel gas, or changes in the availability of oxygen in the firebox can lead to instability of the burner flames. If the proper mixture of fuel and oxygen is not maintained, the burner may move into a phase of sub-stoichiometric combustion, in which there is not enough oxygen present for full combustion of the fuel. Sub-stoichiometric combustion may result in burner flames going unstable and if not immediately corrected, the burner flames may be completely extinguished. This is referred to as flame-out.

It is important that flame-outs be detected quickly because after a flame is extinguished, uncombusted fuel fills the firebox. If this fuel is ignited, it is possible for it to explode, thereby damaging the burner/heater.

One measure of flame performance is firebox draft, which can be measured by measuring the pressure difference between the pressure within the firebox and the pressure outside the firebox. This pressure difference is referred to as a draft pressure or draft measurement. Recently, statistical process monitoring technology has been applied to firebox draft measurements. In statistical process monitoring, the pressure values for the firebox draft are statistically processed to determine a mean and standard deviation of the pressure samples. The standard deviation of the draft pressures is then used to detect flame instability.

SUMMARY

A burner is monitored by monitoring a statistical variable calculated from a draft measurement and monitoring a process variable related to the operation of the burner. An abnormal operation of the burner is determined based upon the statistical variable and the process variable.

In accordance with a further embodiment, a system for monitoring a burner includes a draft measurement device providing a measurement of a draft of the heater and a statistical calculation module for calculating a statistical value based on the draft measurement. One or more process measurement devices measure one or more process variables relating to the burner. A module identifies abnormal operation of the burner based on the measured process variable, the statistical value and parameters representing a relationship between the statistical value and the process variable during normal operation of the burner.

In further embodiments, an apparatus includes a flame stability calculator receiving a value for a process variable, a statistical value for a draft measurement, and parameters representing a relationship between values of the process variable and statistical values of the draft measurement and the flame stability calculator generating a stability value indicating a stability of a flame.

BRIEF DESCRIPTION OF THE DRAWINGS

FIG. 7 is a graph of standard deviation of draft pressure as a function of time during a flame instability test.

FIG. 8 is a graph of firing rates as a function of time during the flame instability tests of FIG. 7.

FIG. 14 is a graph of a standard deviation of draft pressure during a second burner test.

FIG. 15 is a graph of firing rates during the burner test of FIG. 14.

FIG. 16 is a graph of stability values during the burner test of FIG. 14.

DETAILED DESCRIPTION OF ILLUSTRATIVE EMBODIMENTS

Figure 1:
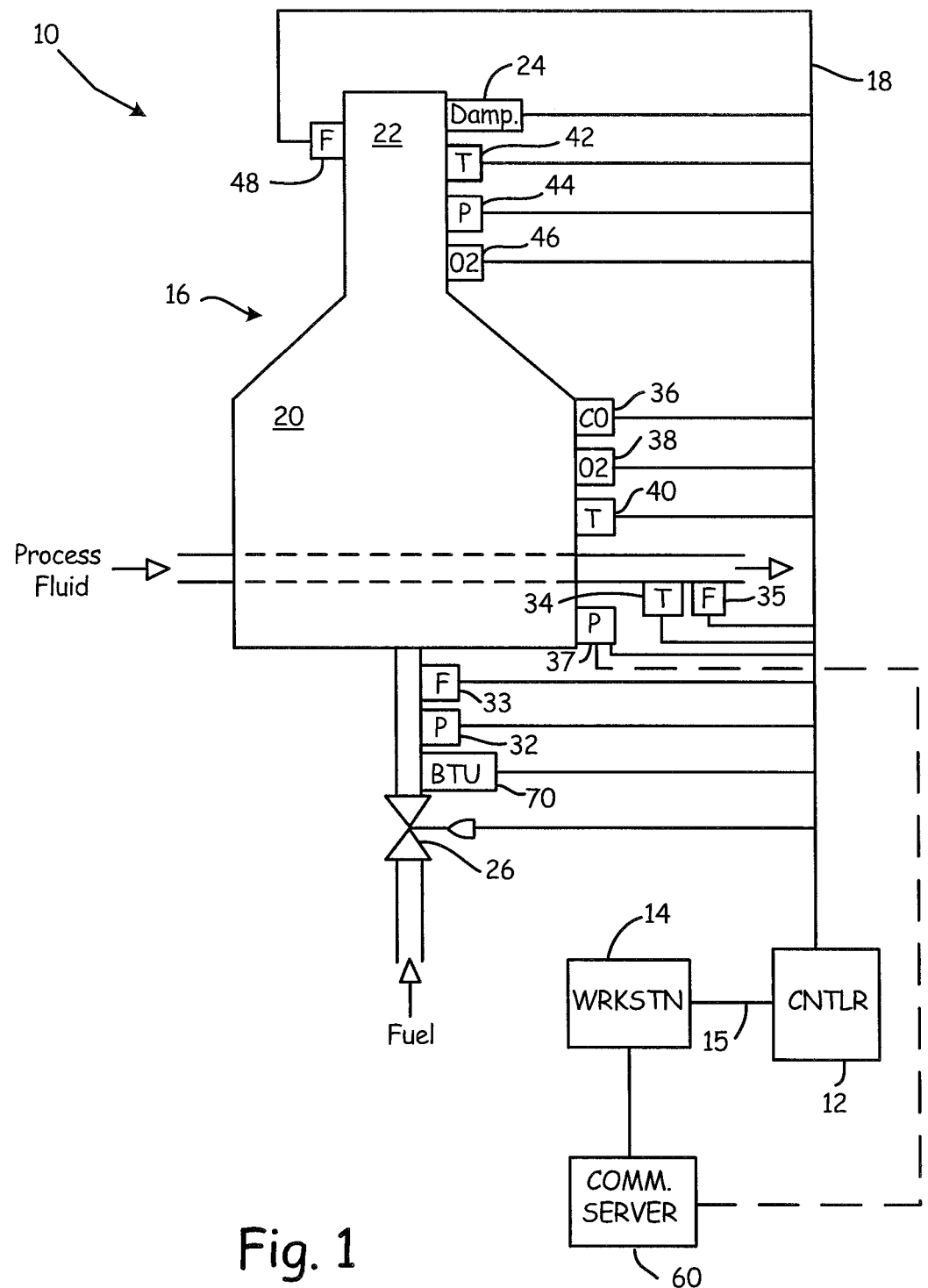
FIG. 1 is a block diagram of an example process plant control and diagnostics network.

FIG. 1 is a block diagram of an example process plant control and diagnostics network 10 that includes a process controller 12 coupled to a workstation 14 via a communication link 15. The communication link 15 may comprise, for example, an Ethernet communications connection, or any other type of wired, optical, or wireless communications connection. Additionally, the communication link 15 may be a continuous or intermittent link. The controller 12 is also coupled to devices or equipment within a process plant via an input/output (I/O) device (not shown) and a set of communication lines or a bus 18. In the example of FIG. 1, the controller 12 is coupled to devices and equipment associated with a heater unit 16 (e.g., crude heaters, fluid heaters, refinery heaters, petrochemical heaters, petroleum heaters, boilers, reboiler heaters, gas heaters, charge heaters, feed heaters, vacuum heaters, liquid heaters, column heaters, pipeline heaters, storage heating systems, etc.). The controller 12, which may be by way of example only, a DeltaV™ controller sold by Emerson Process Management, Inc., is capable of communicating with control elements, such as field devices and function blocks within field devices distributed throughout the process plant to perform one or more process control routines to thereby implement desired control of the heater unit 16. These process control routines may be continuous or batch process control routines or procedures. The workstation 14 (which may comprise, for example, a personal computer, a server, etc.) may be used by one or more engineers or operators to design process control routines to be executed by the controller 12, to communicate with the controller 12 so as to download such process control routines, to receive and display information pertaining to the heater unit 16 during operation of the process plant and to otherwise interact with the process control routines executed by the controller 12.

The workstation 14 includes a memory (not shown) for storing applications, such as configuration design applications, maintenance applications, user interface applications, diagnostics applications, etc., and for storing data, such as configuration data, maintenance data, diagnostics data, etc., pertaining to the configuration of the heater unit 16. The workstation 14 also includes a processor (not shown) that executes the applications to, among other things, enable a user to design process control routines and download those process control routines to the controller 12. Likewise, the controller 12 includes a memory (not shown) for storing configuration data and process control routines to be used to control the heater unit 16 and includes a processor (not shown) that executes the process control routines to implement a process control strategy. If the controller 12 is a DeltaV™ controller, it, in conjunction with one or more applications implemented by the workstation 14, may provide a graphical depiction of the process control routines within the controller 12 to a user illustrating the control elements within the process control routine and the manner in which these control elements are configured to provide control of the heater unit 16.

In the example process plant control and diagnostics network 10 illustrated in FIG. 1, the controller 12 is communicatively coupled via the bus 18 to the heater unit 16. The heater unit 16 includes a furnace 20 through which a process fluid passes and is heated by the furnace 20, and a stack 22. A damper device 24 in the stack 22 regulates airflow and/or draft pressure, and a fuel valve 26 regulates fuel to the furnace. Although a natural draft furnace is shown in FIG. 1, embodiments below may be practiced with forced draft, balanced draft and induced draft furnaces as well. The heater unit 16 may also include a number of sensor devices such as sensor devices associated with the fuel flow, sensor devices associated with the process fluid flow, sensor devices associated with the BTU content of the fuel, sensor devices associated with the furnace, and sensor devices associated with the stack. In the example heater unit 16, a pressure sensing device 32 may be used to sense fuel pressure and a flow sensing device 33 may be used to sense fuel flow downstream from the valve 26 and a BTU measurement device 70 may be used to measure the BTU content of the fuel in real time. BTU measurement device 70 and flow sensing device 33 may be combined to provide a single device that provides a firing rate or heat rate for the heater.

A temperature sensing device 34 may be used to sense the temperature and a flow sensing device 35 may be used to sense the flow of the process fluid exiting the furnace 20. Although only one pass of process fluid through the furnace 20 is shown in FIG. 1, in a typical heater unit, the process fluid may pass through the furnace multiple times and a temperature sensing device (not shown) and/or flow sensing device (not shown) may sense temperature and/or flow of the process fluid after each pass. One or more sensor devices may be used to sense conditions within the furnace including a CO sensing device 36, a draft pressure sensing device 37, an $O_2$ sensing device 38, and a temperature sensing device 40. Draft pressure measurement device 37 measure a differential pressure between the inside of the furnace or firebox and the external atmosphere and thereby provides a measure of the airflow into the furnace. Similarly, one or more sensor devices may be used to sense conditions within the stack including a temperature sensing device 42, a pressure sensing device 44, an $O_2$ sensing device 46, and an air flow sensing device 48. A particular implementation may omit one or more of these sensor devices. For example, although both the $O_2$ sensing device 38 and the $O_2$ sensing device 46 are shown in FIG. 1, a typical heater unit may have only one of $O_2$ sensing device that is associated with either the stack or with the furnace.

As illustrated in FIG. 1, the controller 12 is communicatively coupled to the damper device 24, the valve device 26, and the sensing devices 32-38, 40, 42, 44, 46, 48 and 70 via the bus 18 to control the operation of, and/or to receive data from, these elements. Of course, the controller 12 could be coupled to the elements of the heater unit 16 via additional buses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and/or to the workstation 14 via, for example, the communication link 15 to control other devices or areas associated with the process plant and the operation of such additional controllers may be coordinated with the operation of the controller 12 illustrated in FIG. 1 in any desired or known manner.

With respect to the furnace 20, for example, one or more other sensing devices in addition to, or instead of, CO sensing device 36, pressure sensing device 37, $O_2$ sensing device 38, and the temperature sensing device 40 could be used. With respect to the stack 22, for example, one or more other sensing devices in addition to, or instead of, temperature sensing device 42, pressure sensing device 44, $O_2$ sensing device 46, and air flow sensor 48 could be used. For instance, a CO sensing device associated with the stack 22 could be used in addition to the devices shown in FIG. 1, or instead of one or more of those devices.

Each of one or more of the sensing devices 32-38, 40, 42, 44, 46, 48, and 70 may include a memory (not shown) for storing routines such as a routine for implementing statistical data generation and collection pertaining to one or more process variables sensed by the sensing device. Each of the one or more of the sensing devices 32-38, 40, 42, 44, 46, 48 and 70 may also include a processor (not shown) that executes routines such as a routine for implementing statistical data generation and collection. The routines stored and implemented by a sensing device may include one or more blocks for generating, collecting and/or processing statistical data associated with the sensing device. Such a block could comprise, for example, an advanced diagnostics block (ADB), which is a known Foundation Fieldbus function block that can be added to Fieldbus devices to generate, collect and process statistical data within Fieldbus devices. Other types of blocks or modules could also be used to generate and collect device data and calculate, determine, and/or process one or more statistical measures or parameters for that data. Moreover, the sensing devices need not comprise Fieldbus devices. Further, the statistical data generating, collecting and/or processing block may be implemented by any combination of software, firmware, and/or hardware within the sensing device.

As an example, the pressure sensing device 37, which measures a draft pressure in heater 10, may include a memory (not shown) for storing routines such as a routine for implementing statistical data generation and collection pertaining to draft pressures sensed and sampled by pressure sensing device 37. Pressure sensing device 37 may also include a processor (shown in FIG. 2) that executes routines such as a routine for implementing statistical data generation, collection and communication. The routines stored and implemented by pressure sensing device 37 may include one or more blocks for generating, collecting and/or processing statistical data associated with pressure sensing device 37. The blocks that provide statistical values are referred to as statistical process monitoring blocks. For example, the blocks could comprise an ADB or some other type of statistical data collection block. However, pressure sensing device 37 need not comprise a Fieldbus device.

The term statistical process monitoring (SPM) block is used herein to describe functionality that performs statistical process monitoring on at least one process variable or other process parameter, and may be performed by any desired software, firmware or hardware implemented by or within the device or even outside of a device for which data is collected. It will be understood that, because the SPMs are generally implemented by, or as part of, the devices where the device data is collected, the SPMs can acquire quantitatively more and qualitatively more accurate process variable data. As a result, the SPM blocks are generally capable of determining better statistical calculations with respect to the collected process variable data than a block implemented outside of the device in which the process variable data is collected.

While the SPM blocks have been described herein as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol.

Data gathered and generated by some or all of the SPM blocks may be made available to an external client, such as to the workstation 14 through the controller 12 and the communication link 15. Additionally or in the alternative, data gathered and generated by some or all of the SPM blocks may be made available to the workstation 14 through, for example, a communication server 60. The communication server 60 may comprise, for example, an Object Linking & Embedding (OLE) for Process Control (OPC) server, a server configured to operate in an Ovation® communications network, a web server, etc. The communication server 60 may receive data gathered and generated by some or all of the SPM blocks via a communication link such as a wireless connection, a hardwired connection, an intermittent connection (such as one that uses one or more handheld devices), or any other desired communication connection using any desired or appropriate communication protocol. Of course, any of the communication connections described herein may use an OPC communication server to integrate data received from different types of devices in a common or consistent format.

Still further, it is possible to implement SPM blocks in a workstation, server, personal computer, etc., or other field devices separate from the field device to perform statistical process monitoring outside of the field device that collects or generates the raw data, such as pressure data, temperature data, $O_2$ data, etc. Thus, for example, one or more SPM blocks could be implemented by the workstation 14. These SPM blocks could collect raw pressure data via, for example, the controller 12 or the communication server 60 and could calculate some statistical measure or parameter, such as a mean, a standard deviation, etc. for that pressure data. While these SPM blocks are not located in the field device that collects the data and, therefore, generally may not be able to collect as much pressure data to perform the statistical calculations due to the communication requirements for this data, these blocks are helpful in determining statistical parameters for a device that does not have or support SPM functionality. Thus, it will be understood in the discussion below, that any statistical measurements or parameters described to be generated by SPM blocks, may be generated by SPM blocks implemented by the field device or by other devices.

In operation, the controller 12 may control the fuel flow to the furnace via the valve 26. The temperature sensing device 34 may provide data that indicates a temperature of the process fluid exiting the furnace 20. Additionally, the controller 12 may control the airflow and/or draft pressure via the damper device 24.

A SPM block receives a process signal generated by a field device and calculates statistical parameters for the process signal. These statistical parameters may include one or more of a standard deviation, a mean, a sample variance, a root-mean-square (RMS), a range ($\Delta R$) a rate of change (ROC) of the process signal, a maximum of the process signal, and a minimum of the process signal, for example. Examples of equations for generating these parameters include:

$$\text{mean} = \frac{1}{N}\sum_{i=1}^{N} x_i \qquad \text{EQ. 1}$$

$$\text{RMS} = \sqrt{\frac{1}{n}\sum_{i=1}^{N} x_i^2} \qquad \text{EQ. 2}$$

$$\text{standard deviation} = \sqrt{\frac{\sum_{i=1}^{N}(x_i - \text{mean})^2}{N-1}} \qquad \text{EQ. 3}$$

$$ROC = \frac{x_i - x_{i-1}}{T} \qquad \text{EQ. 4}$$

-continued $$\Delta R = X_{MAX} - X_{MIN} \qquad \text{EQ. 5}$$

where N is the total number of data points in the sample period, $x_i$ and $x_{i-1}$ are two consecutive values of the process signal and T is the time interval between the two values. Further, $X_{MAX}$ and $X_{MIN}$ are the respective maximum and minimum of the process signal over a sampling or training time period. These statistical parameters may be calculated using different equations or algorithms as well. When the process variable is the draft pressure, $x_i$ represents a single draft pressure measurement.

Figure 2:
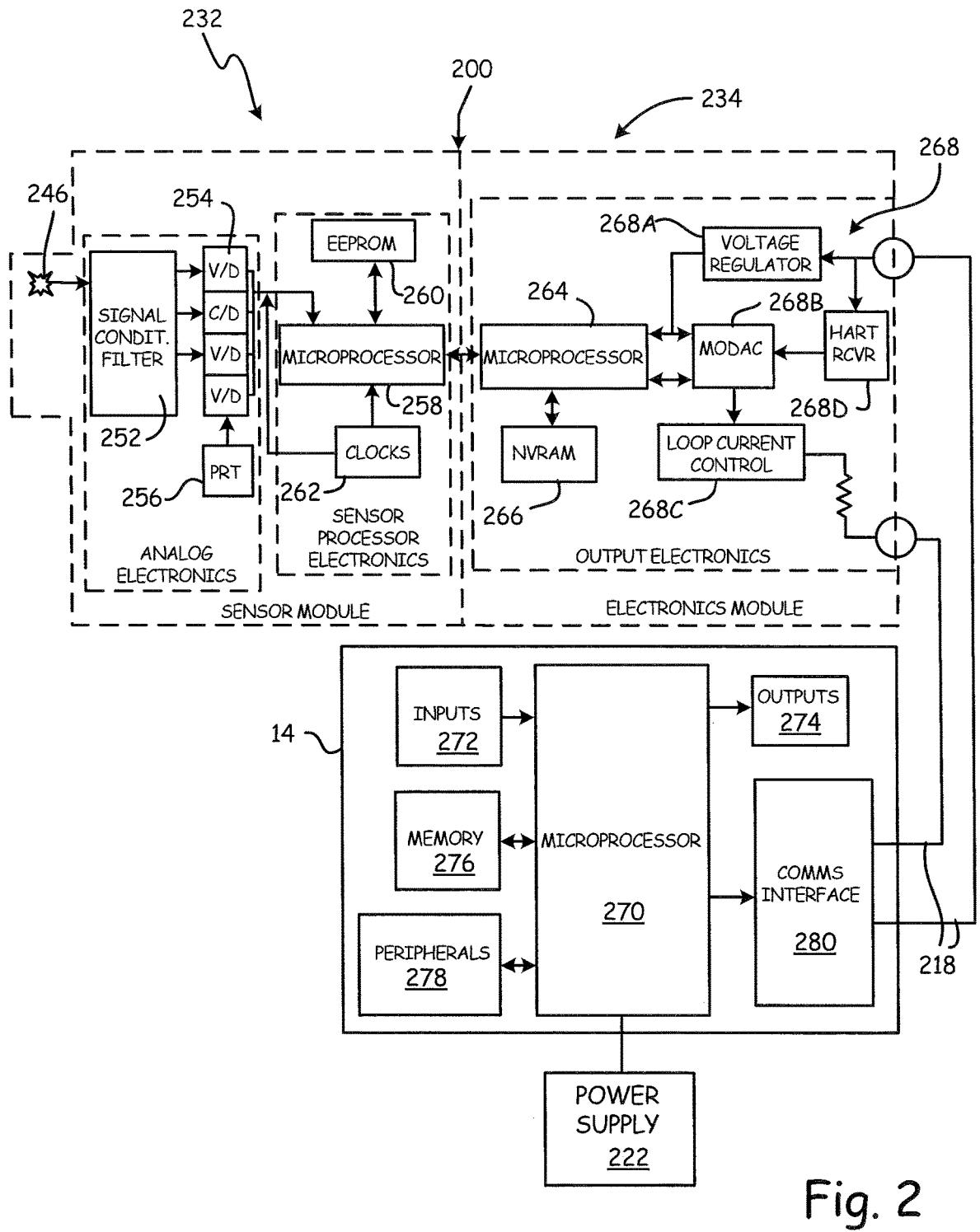
FIG. 2 is a block diagram of circuit elements in a field device and workstation used to implement various embodiments.

FIG. 2 shows a circuit diagram of a field device 200 and work station 14 of FIG. 1. Field device 200 is a generic representation of a field device that provides circuit components found in field devices such as draft pressure measurement device 37, fuel flow measurement device 33, fuel pressure measurement device 32 and BTU measurement device 70. Device 200 is shown to include a sensor module 232 and a circuitry module 234. According to this embodiment, sensor module 232 includes sensor 246, analog electronics and sensor processor electronics. Device circuitry module 234 includes output electronics. Analog electronics in sensor module 232 include conditioning circuitry 252, converter circuitry 254 and platinum resistance thermometer (PRT) 256. Sensor processor electronics include sensor microprocessor 258, memory 260 and clock 262. Output electronics include output microprocessor 264, memory 266, and communication circuitry 268. Workstation 14 includes microprocessor 270, inputs 272, outputs 274, memory 276, peripherals 278 and communications interface 280. A power supply 222 provides power to workstation 14 as well as device 200 through workstation 14.

Sensor 246 senses a process variable such as static pressure, differential pressure, temperature, and BTU content, for example. Although only a single sensor is shown for simplicity, device 200 may have multiple different sensors. In this embodiment, analog output from sensor 246 is transmitted to conditioning circuitry 252, which amplifies and conditions (e.g. filters) the signals. Converter circuitry 254 converts the analog signals generated by sensor 246 into digital signals usable by microprocessor 258. As shown in FIG. 2, converter circuitry includes both voltage-to-digital (V/D) and capacitance-to-digital (C/D) converters. PRT 256 provides a temperature signal to converter circuitry 254 indicative of the temperature near sensor 246 so that the sensor signals can be compensated for temperature variations. Microprocessor 258 receives digitized and conditioned sensor signals from converter circuitry 254 including a digitized temperature signal from PRT 256. Microprocessor 258 compensates and linearizes the sensor signals for sensor-specific errors and non-linearity using correction constants stored in memory 260. Clock 262 provides microprocessor 258 with clock signals. Digitized, compensated and corrected sensor signals are then transmitted to microprocessor 264.

Microprocessor 264 analyzes the sensor signals to determine a process state. In particular, memory 266 (which may be non-volatile random access memory (NVRM)) includes lookup tables in which are stored algorithm coefficients which are used to determine particular values of process state, such as draft pressure, mass flow rate, BTU content, and or firing rate, based on the magnitude of the sensed process variables. Additionally, hardware parameters and fluid parameters, such as the type and the bore diameter of a pipe carrying a fluid and the viscosity and density of the fluid, are uploaded into memory 266 through control loop 218. In other embodiments, data relating to hardware parameters and fluid parameters are directly entered into transmitter 264 through a user interface (not indicated in FIG. 2). Furthermore, fluid parameters may be a function of the process variables such that various fluid parameters are stored in the lookup tables and selected based on other fluid parameters and the sensed process variables.

Using hardware parameters, fluid parameters, sensed process variables, and algorithm coefficients, microprocessor 264 performs a run-time calculation. The runtime calculation evaluates a process condition equation, to determine a process condition or process state. A process condition signal representing the calculated process condition and the sensor signals are transmitted to workstation 14 over control loop 218 using communication circuitry 268. Communication circuitry 268 includes voltage regulator 268A, modulator circuitry 268B, loop current controller 268C and a protocol receiver, such as a 4-20 mA HART® receiver or transceiver 268D, to enable transmitter circuitry module 234 to communicate with communication interface 280 of workstation 14.

NVRAM 266 also contains instructions for statistical process monitoring (SPM). These instructions are executed in parallel with the instructions used to generate the process state. The SPM instructions compute statistical values from the sensor signals such as the mean/median, standard deviation, etc. of one or more of the sensor signals. For example, a standard deviation of a draft pressure may be determined.

According to this embodiment, the statistical values produced by microprocessor 264 are sent to workstation 14 through communication circuitry 268. Workstation 14 can store the statistical values in a memory 276 and can display historical statistical values on an output monitor 274. Microprocessor 270 of workstation 14 can also use the statistical value to determine whether a burner is operating in abnormal manner as discussed further below.

Workstation 14 typically comprises a personal computer, such as a portable computer, installed near an industrial process to monitor and regulate process variables and process conditions of the industrial process. Workstation 14 includes inputs 272, such a keyboard, mouse, or other user interface, that enable operators to input process control inputs into memory 276. Workstation 14 also includes outputs 274, such as a monitor, which enable data to be viewed. Peripherals 278, such as a printer or other commonly used devices, can also be connected to workstation 14 to input and extract data from microprocessor 270. Workstation 14 includes communications interface 280, which transmits data to and receives data from microprocessor 264. Workstation 14 is configured to provide complete evaluation and analysis of the capabilities of module 234 and the sensor signals generated by sensor 246.

Through the circuit elements shown in FIG. 2, workstation 14 is able to receive a standard deviation of a draft pressure and at least one process variable that describes a condition of the burner/heater. In accordance with some embodiments, the at least one process variable is a firing rate of the burner/heater, which is a measure of the amount of heat released by the burner per a selected unit of time. For example, the firing rate can be expressed as the number of BTU's released per hour. In cases where a BTU sensor is not available, firing rate can be estimated from fuel flow or fuel pressure alone.

Figure 3:
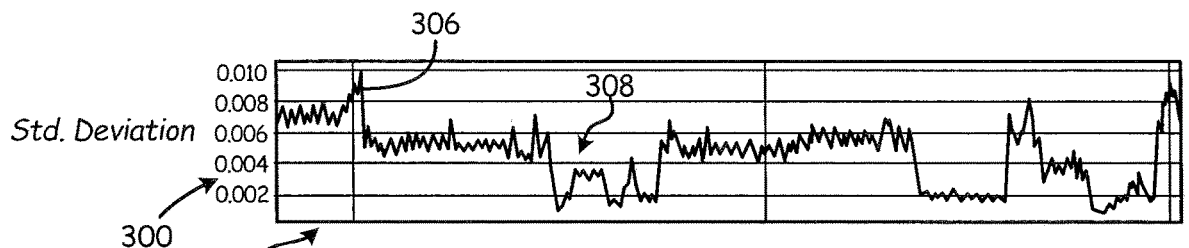
FIG. 3 is a graph of a standard deviation of a draft pressure as a function of time.
Figure 4:
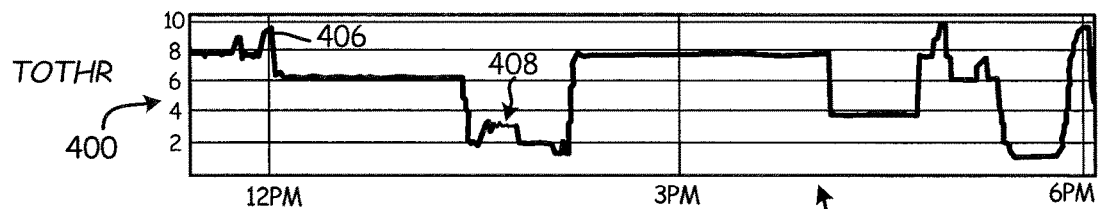
FIG. 4 is a graph of firing rate as a function of time.

The standard deviation of the draft pressure may vary even when the flame is stable. FIG. 3 provides a graph of the standard deviation of the draft pressure over a period of time during which the flame remains in a stable condition. In FIG. 3, the standard deviation of the draft pressure is shown on vertical axis 300 and time is shown along horizontal axis 302. In the graph of FIG. 3, the standard deviation of the draft pressure is shown to rise at point 306 and is shown to drop in area 308. Neither the rise nor the drop in the standard deviation of the draft pressure is indicative of instability in the flame. Instead, the present inventors have discovered that the changes in the standard deviation of the draft pressure coincide with changes in the firing rate of the burner. FIG. 4 provides a graph of the firing rate as a function of time for the burn test shown in FIG. 3. In FIG. 4, the firing rate is depicted on vertical axis 400 and time is shown along horizontal axis 402 where the time span of horizontal axis 402 coincides with the time span of horizontal axis 302 of FIG. 3.

As shown in FIG. 4, the firing rate increases at 406 at the same time the standard deviation of the draft pressure increases at time 306. Similarly, when the firing rate decreases at 408, the standard deviation of the draft pressure also decreases at area 308. Thus, changes in the firing rate appear to cause changes in the standard deviation of the draft pressure. This indicates that as the firing rate increases, variations in the draft pressure increase and as the firing rate decreases, variations in the draft pressure decrease. Note that these changes occur even though the flame remains in a stable condition.

Figure 5:
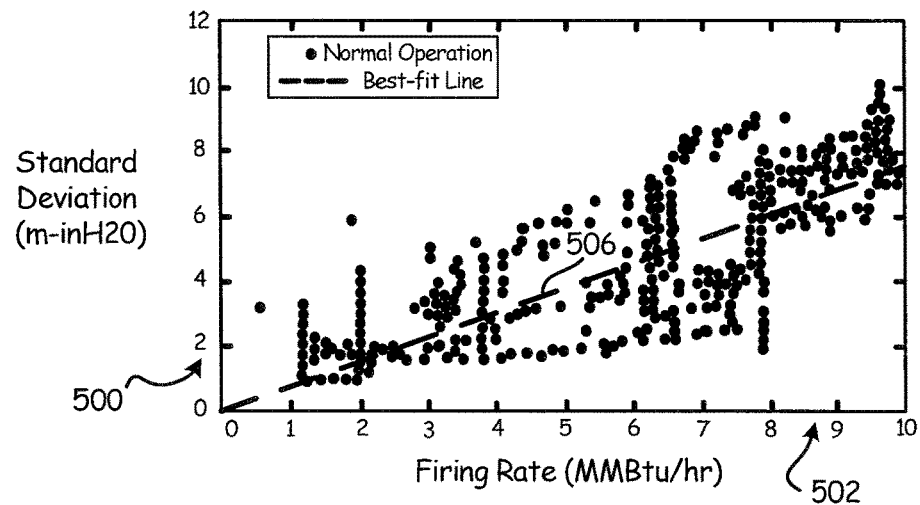
FIG. 5 is a graph of standard deviations of draft pressure as a function of firing rate.

FIG. 5 provides a graph of the standard deviation of the draft pressure as a function of firing rate during normal operations when the flame is stable. In FIG. 5, the standard deviation of the draft pressure is shown on vertical axis 500 while the firing rate is shown along horizontal axis 502. Each dot on FIG. 5 represents a time point during a test of the burner during which the flame was stable. A best fit curve 506, which is shown to be linear in FIG. 5, shows a general relationship between the firing rate and the standard deviation of the draft pressure.

Figure 6:
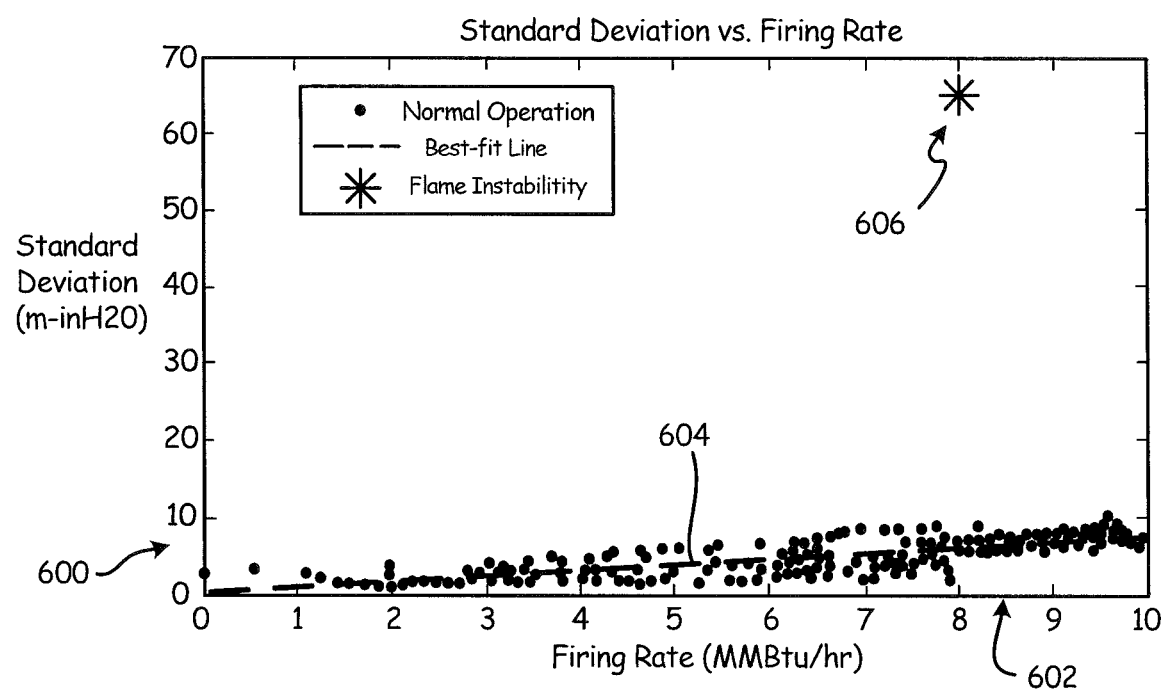
FIG. 6 is a graph of standard deviations of draft pressure as a function of firing rate showing a standard deviation/firing rate pair during flame instability.

FIG. 6 shows a second graph of the standard deviation of the draft pressure as a function of the firing rate showing the relationship between data points for stable flames and a data point for an unstable flame. In FIG. 6, the standard deviation of the draft pressure is shown along vertical axis 600 and the firing rate is shown along horizontal axis 602. The round dots in FIG. 6 represent data points for the standard deviation of the draft pressure and the firing rate during normal operation when the flame is stable. A line 604, indicates the general relationship between the standard deviation of the draft pressure and the firing rate. The stared data point 606 provides the values for the standard deviation of the draft pressure and the firing rate during abnormal operation when the flame is unstable. As depicted in FIG. 6, data point 606 diverges dramatically from line 604 indicating that the combination of the firing rate and the standard deviation of the draft pressure during flame instability is significantly different from the combination of the firing rate and standard deviation of the draft pressure during normal operations.

FIGS. 7 and 8 provide graphs of the standard deviation of the draft pressure and the firing rate, respectively, for burn tests involving both stable and unstable flames. In FIG. 7, time is shown along horizontal axis 702 and in FIG. 8, time is shown along horizontal axis 802 where the same times in each graph are vertically aligned. In FIG. 7, the standard deviation of the draft pressure is shown on vertical axis 700 and in FIG. 8, the firing rate is shown on vertical axis 800.

During a first test 804, fuel for one of the burners in a firebox is gradually cutoff to form a "lazy" flame. This lazy flame is still considered stable. As depicted by "L" box 806, during low fuel pressure test 804, the burners have a low firing rate. Because the flame is stable during the low fuel pressure test, the standard deviation of the draft pressure is also low as indicated by "L" box 706 in FIG. 7.

During a second test 808, the firing rate of the burners is increased by increasing the fuel and the oxygen level provided to the burners such that there is excess oxygen in the firebox. As indicated by "M" box 810, increasing the fuel and the oxygen level results in a medium level firing rate and as indicated by "M" box 710 of FIG. 7, results in a medium level standard deviation of the draft pressure.

During a third test 812, the fuel rate from test step 808 is decreased and the oxygen level provided to the burners is decreased to place the burners in a low excess oxygen state. As shown in FIG. 8, this results in a low firing rate 814 and a corresponding low standard deviation of the draft pressure 714. During step 812, the flames were observed to remain stable in the burners.

During a fourth test 816, the amount of fuel provided to the burners is increased while maintaining a low oxygen environment. As indicated by "H" box 818, this results in a high firing rate and as indicated by "H" box 718, produces a corresponding high standard deviation in the draft pressure. During this initial phase of step 816, the burner was observed to be stable.

At step 820, a single burner in the firebox entered sub-stoichiometric combustion resulting in a reduction in the firing rate to a medium range 822. Initially, the standard deviation of the draft pressure dropped to a medium value 722. However, as the sub-stoichiometric combustion of the flame continued, the standard deviation of the draft pressure increased to a high value 724. Fuel to the burners was then reduced causing the firing rate to drop to a low level 826 thereby taking the burner out of sub-stoichiometric combustion and resulting in a low standard deviation of the draft pressure at point 726 of FIG. 7.

As depicted by FIGS. 6, 7 and 8, the relationship between firing rate and the standard deviation of the draft pressure is consistent across several different conditions in the firebox as long as there is not prolonged sub-stoichiometric combustion or flame instability. However, with prolonged sub-stoichiometric combustion or flame instability, the relationship between the standard deviation of the draft pressure and the firing rate becomes significantly different.

Figure 9:
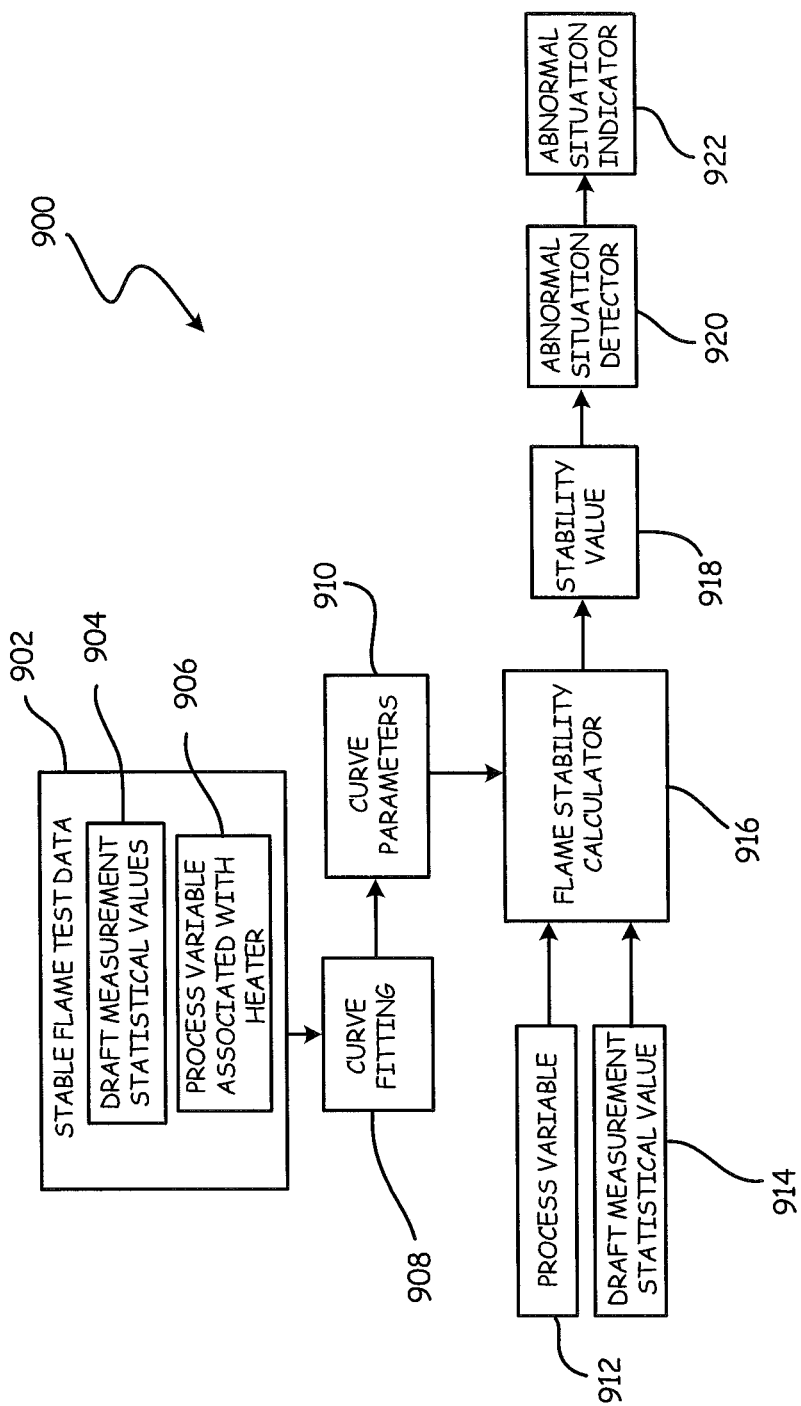
FIG. 9 is a block diagram of elements used to identify an abnormal situation in a burner.
Figure 10:
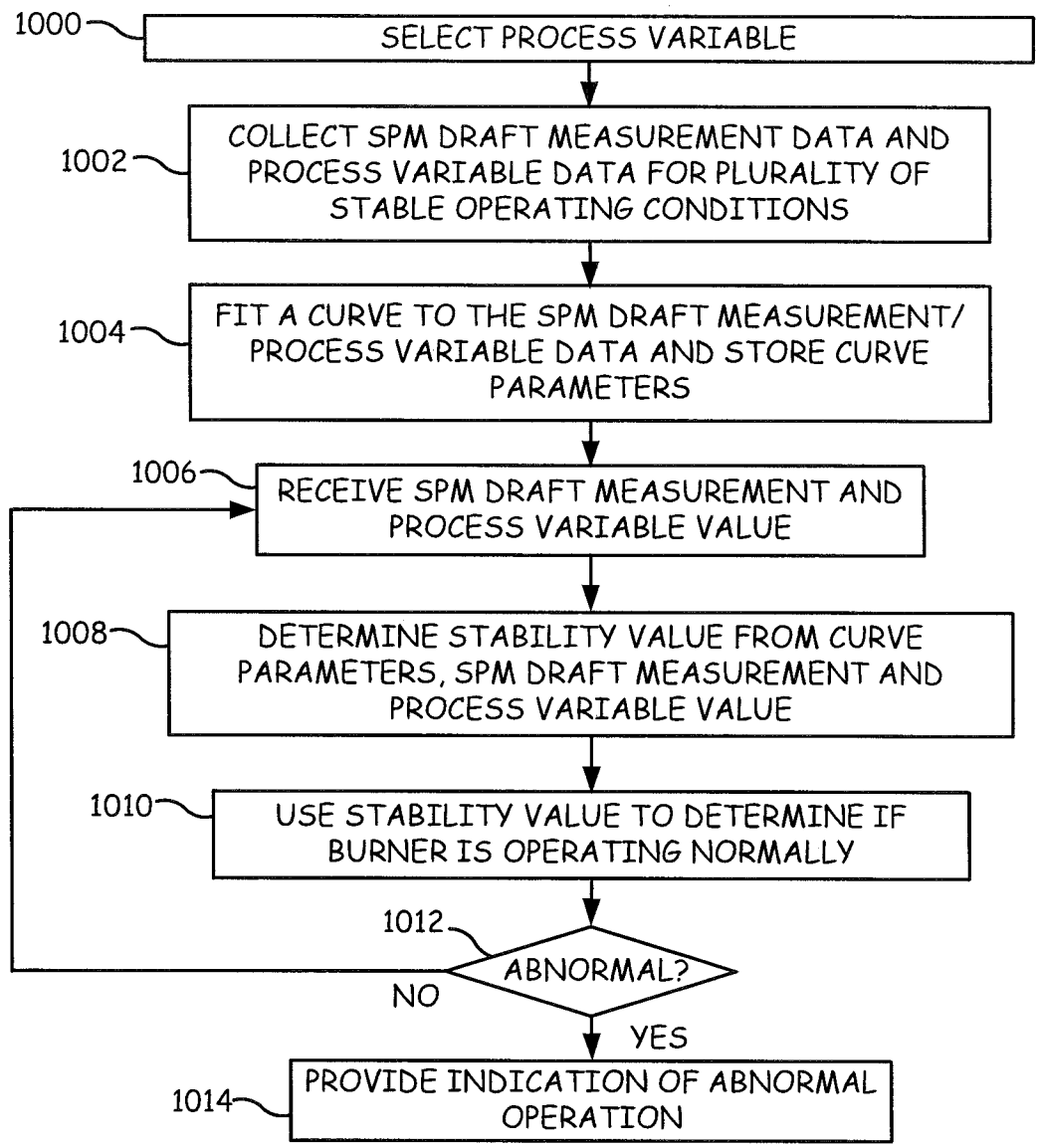
FIG. 10 is flow diagram of a method of determining an abnormal situation in a burner.

FIGS. 9 and 10 provide a block diagram and a flow diagram of elements and steps used to identify when a burner is operating in an abnormal manner based on the standard deviation draft pressure and the firing rate.

In step 1000 of FIG. 10, a process variable is selected to normalize the draft measurements. In accordance with some embodiments, the process variable is the firing rate of the burners in the firebox. However, in other embodiments, other process variables such as fuel pressure, BTU content, fuel flow rate, process flows, or furnace temperatures may be used. At step 1002, SPM draft measurement data 904 and process variable data 906 representing stable operations test data 902 are collected for a plurality of stable operating conditions of the burner. These stable operating conditions can include low fuel pressure on one or more burners, high fuel pressure with excess oxygen, and low $O_2$ pressure. In each of these stable operating conditions, the flame produced by the burners is observed to be stable and as such, is not experiencing sub-stoichiometric combustion, near flame-out or in flame-out. In accordance with one embodiment, the SPM draft measurement data is collected from pressure measurement device 37 and the firing rate data is collected by calculating firing rate data from fuel flow data provided by fuel flow measurement device 33 and BTU data from BTU measurement device 70. In particular, BTU data from BTU measurement device 70 indicates the amount of heat in a volume of the fuel gas and fuel flow measurement device 33 indicates the volume of gas flowing to the burners each second. In accordance with other embodiments, the firing rate is provided directly from a firing rate measurement device that determines both the flow rate of the fuel and the BTU content of the fuel.

At step 1004, a curve is fit to the SPM draft measurement/process variable data using a curve fitting algorithm 908 to form curve parameters 910. As shown in FIGS. 5 and 6, in accordance with one embodiment, a linear curve is fit to the SPM draft measurement/process variable data. However, those skilled in the art will recognize that more complex curves could be fit to the data including quadratic and cubic curves. For example, a curve may be described as:

$$\sigma = aF + bF^2 + cF^3 \qquad \text{EQ. 6}$$

or as:

$$F = x\sigma + y\sigma^2 + z\sigma^3 \qquad \text{EQ. 7}$$

where $\sigma$ is the standard deviation of the draft pressure, F is the firing rate, and a, b, c, x, y, and z are parameters describing the curves. The parameters determined by curve fitting module 908 are stored in memory as curve parameters 910. The curves define an observed relationship between the standard deviation of the draft pressure and the firing rate.

At step 1006, a flame stability calculator 916 receives a current process variable value 912 and a statistical variable 914 calculated from a draft measurement. Current process variable value 912 is a process variable related to the operation of the burner/heater. In accordance with some embodiments, statistical variable 914 is a standard deviation of draft pressure values. As noted above, in accordance with some embodiments, statistical variable 914 is generated within a field device such as pressure measurement device 37.

At step 1008, flame stability calculator 916 uses curve parameters 910 to determine a stability value from the process variable 912 and the draft pressure standard deviation value 914. In accordance with one embodiment, the stability value is computed as:

$$S = a\frac{F}{\sigma} + b\frac{F^2}{\sigma} + c\frac{F^3}{\sigma} \qquad \text{EQ. 8}$$

or as:

$$S = x\frac{\sigma}{F} + y\frac{\sigma^2}{F} + z\frac{\sigma^3}{F} \qquad \text{EQ. 9}$$

where S is the stability values and the other values are taken from equations 6 and 7 above.

In one particular embodiment, where there is a linear relationship between the firing rate and the standard deviation of the draft pressure as shown in FIGS. 5 and 6, EQ. 9 becomes:

$$S = \frac{x\sigma}{F} \qquad \text{EQ. 10}$$

where the curve parameter x is the inverse of the slope of the lines shown in FIGS. 5 and 6.

In alternative embodiments, instead of collecting SPM draft pressure data and process variable data and fitting a curve to that data, the relationship between the standard deviation of the draft pressure and the firing rate is assumed to be linear and the value of x in EQ. 10 is set to:

$$x = \frac{F_{design}}{\sigma_{base}} \qquad \text{EQ. 11}$$

where $F_{design}$ is the design firing rate and $\sigma_{base}$ is the value of the standard deviation of the draft pressure at the design firing rate with design excess oxygen in the firebox.

For stable flames, the stability value S should be around one. However, when there is instability in the burner flames or other abnormal conditions in the burners such as low excess oxygen, sub-stoichiometric combustion, near flame-out or flame-out, the value of S will be significantly higher for embodiments that use EQ. 7 and EQ. 9 above or significantly lower for embodiments that use EQ. 6 and EQ. 8 above.

At step 1010, stability value 918 produced by flame stability calculator 916 is used by an abnormal situation detector 920 to determine whether the burner is in an abnormal condition such as an unstable flame, low excess oxygen, sub-stoichiometric combustion, near flame-out or flame-out, at step 1012. In accordance with one embodiment, abnormal situation detector 920 determines if the burner is in an abnormal condition by applying one or more statistical process control (SPC) rules to determine if the value of the standard deviation of the draft pressure is statistically different from observed relationship between the standard deviation of the draft pressure and the process variable during stable conditions. If the burner is not in an unstable condition, the process returns to step 1006 to receive new SPM draft measurement data and process variable data. Steps 1006, 1008, 1010 and 1012 are repeated indefinitely until an abnormal condition is detected at step 1012. When an abnormal situation is detected, an abnormal situation indictor 922 is generated by abnormal situation detector 920 at step 1014. This abnormal situation indicator 922 can be an alarm provided on workstation 14 or a separate alarm provided in a control room or on a mobile device such as a mobile phone or tablet device.

The elements of FIG. 9 that perform the method of FIG. 10 are implemented in the workstation 14 in accordance with some embodiments. In particular, microprocessor 270 of FIG. 2 can execute instructions stored in memory 276 that perform curve fitting operation 908, and that act as flame stability calculator 916 and abnormal condition detector 920. The process variable and the standard deviation of the draft pressure may be received through communication interface 280 and the stability value curve parameters and abnormal situation indicator may be stored in memory 276.

Figures 11, 12, 13:
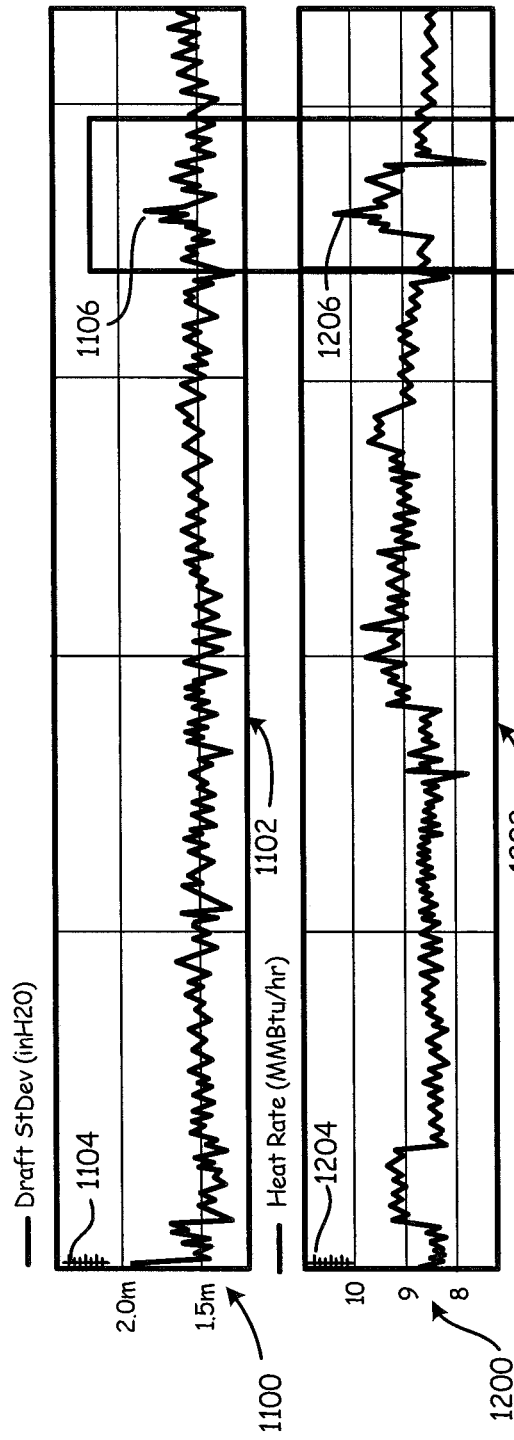
FIG. 11 is a graph of a standard deviation of a draft pressure during burner tests.
FIG. 12 is a graph of firing rates during the burner tests of FIG. 11.
FIG. 13 is a graph of stability values during the burner test of FIG. 11.

FIGS. 11, 12 and 13 provide graphs showing the relationship between the standard deviation of the draft pressure, the firing rate, and the stability value over a period of 30 days where the first day includes the burner tests of FIGS. 7 and 8. In FIGS. 11, 12 and 13, time is shown along horizontal axes 1102, 1202 and 1302 with the same times in each graph vertically aligned between the graphs. In FIG. 11, vertical axis 1100 indicates the standard deviation of the draft pressure. In FIG. 12, vertical axis 1200 indicates the firing rate of the burners. In FIG. 13, vertical axis 1300 indicates the value of the stability value. As shown in FIG. 13, the highest instability value 1304 occurred during the burner tests of FIGS. 7 and 8 which correspond to firing rate 1204 and draft pressure standard deviation 1104. Thus, the stability value indicates that the flame became unstable during those burner tests. During the remainder of the burner's operation in FIGS. 11, 12 and 13, the burner flame remains stable. During a period 1310, the standard deviation of the draft pressure increased as indicated by value 1106. However, this increase in the standard deviation of the draft pressure appears to be associated with an increase in the firing rate at 1206. As a result, the stability value 1306 remains below 1.1 indicating healthy combustion.

FIGS. 14, 15 and 16 provide graphs of the standard deviation of the draft pressure, the firing rate, and the stability value, respectively, for a set of burner tests. Axes 1402, 1502 and 1602 provide times with the same times in each graph vertically aligned between the graphs. Vertical axis 1400 provides the standard deviation of the draft pressure, vertical axis 1500 provides the firing rate, and vertical axis 1600 provides the stability value. At points 1406, 1506, and 1606, a high fuel pressure test is performed in which the amount of fuel provided to the burner is increased. During this test, the standard deviation of the draft pressure is shown to increase as indicated by point 1406. This increase corresponds to an increase in the firing rate as indicated by point 1506. Because the increase in the standard deviation of the draft pressure corresponds with the increase in the firing rate, the stability value 1606 remains below 1.1 indicating a stable flame.

At points 1408, 1508 and 1608, a low oxygen test is performed in which the amount of fuel provided to the burner is increased while the amount of oxygen is kept at a low level. As indicated by point 1408, the standard deviation of the draft pressure increases as the firing rate increases at point 1508. Although flame instability was not observed during this test, the stability value increases above 1.1 at point 1608 indicating something abnormal in the combustion such as sub-stoichiometric combustion, low $O_2$, flame instability or flame-out.

At point 1510, the firing rate drops off however the standard deviation of the draft pressure remains high at corresponding point 1410. As a result, the stability value 1610 during this period is high indicating that the flame is unstable, there is low excess oxygen, there is sub-stoichiometric combustion, near flame-out or flame-out.

In accordance with one embodiment, the graphs of FIGS. 14 and 15 may be displayed on a monitor of workstation 14 in real time to show an operator the current standard deviation of the draft pressure and the current firing rate. In accordance with further embodiments, the graph of FIG. 16 is also displayed on a monitor of workstation 14 to show an operator the current stability of a burner. As such, FIGS. 14, 15 and 16 represent user interfaces that are provided to an operator to assist the operator in controlling a burner/heater and thereby avoid flame-out conditions in the burner/heater.

Although the discussion above refers to firing rate, in alternative embodiments, volumetric firing rate, which is a measure of the BTUs per hour per cubic foot, is used in place of firing rate.

Although embodiments are discussed above with reference to heaters, those skilled in the art will recognize that the embodiments may be implemented in any burner applications including burners used to combust waste gas without heating a process material.

Although the present invention has been described with reference to preferred embodiments, workers skilled in the art will recognize that changes may be made in form and detail without departing from the spirit and scope of the invention.

What is claimed is:

1. A method of monitoring a burner comprising:
monitoring a statistical variable calculated from a furnace draft pressure measurement measured within a furnace of the burner;
monitoring at least one process variable, other than the furnace draft pressure measurement, related to the operation of the burner;
applying the statistical variable, the process variable, and a curve parameter of a curve fit equation describing a relationship between the statistical variable and the process variable to a stability calculator to generate a stability value, where under the relationship either the statistical variable is a function of the process variable and the curve parameter or the process variable is a function of the statistical variable and the curve parameter; and
displaying a real-time graph of the statistical variable and a real-time graph of the stability value to visually display when a change in the statistical variable is associated with a change in the stability value.

2. The method of claim 1, wherein the statistical variable comprises a standard deviation.

3. The method of claim 1, wherein the statistical variable is calculated within a draft pressure measurement device that produces the furnace draft pressure measurement.

4. The method of claim 1, wherein the process variable comprises a firing rate.

5. The method of claim 1, wherein some values of the stability value indicate abnormal operation of the burner comprising one or more of the following: unstable burner flames, low excess oxygen, sub-stoichiometric combustion, or flame-out.

6. The method of claim 1, further comprising determining the relationship between the statistical variable and the process variable based on values of the statistical variable and the process variable observed during stable operations.

7. The method of claim 6, wherein the relationship is linear.

8. The method of claim 6, wherein the statistical variable is a standard deviation and the process variable is the firing rate.

9. The method of claim 6, wherein determining the relationship comprises fitting the curve to the values of the statistical variable and the process variable observed during stable operations.

10. The method of claim 6, further comprising detecting an abnormal situation when a relationship between a current value of the statistical variable and a current value of the process variable differs from the relationship between the statistical variable and the process variable.

11. The method of claim 10, further comprising detecting an abnormal situation when the relationship between the current value of the statistical variable and the current value of the process variable is statistically different from the relationship between the statistical variable and the process variable.

12. A system for monitoring a burner comprising:
a draft pressure measurement device providing a furnace draft pressure measurement of a draft pressure within a furnace of the burner;
a statistical calculation module for calculating a statistical value based on the furnace draft pressure measurement;

a process measurement device for measuring a process variable, other than a furnace draft pressure measurement, relating to the burner;

a module for calculating a stability value based on the measured process variable, the statistical value and curve parameters of a curve fit equation representing a relationship between the statistical value and the process variable during normal operation of the burner where the parameters either describe the statistical value as a function of the value of the process variable or describe the value of the process variable as a function of the statistical value; and a workstation for displaying a graph of the statistical value and a graph of the stability value to visually display when a change in the statistical variable is associated with a change in the stability value.

13. The system of claim 12 wherein the curve parameters representing a relationship between the statistical value and the process variable indicate a linear relationship between the statistical value and the process variable.

14. The system of claim 12 wherein the statistical value comprises a standard deviation of a furnace draft pressure.

15. The system of claim 14 wherein the process variable comprises a firing rate of the burner.

16. The system of claim 14 wherein the process variable comprises a volumetric firing rate of the burner.

17. The system of claim 14, wherein some values of the stability value indicate abnormal operation in the form of one or more of the following: unstable burner flames, low excess oxygen, sub-stoichiometric combustion, or flame-out.

18. An apparatus comprising:

a flame stability calculator receiving a value for a process variable other than a furnace draft pressure measurement, a statistical value for the furnace draft pressure measurement, and curve parameters of a curve fit equation representing a relationship between values of the process variable and statistical values of the furnace draft pressure measurement where the curve parameters either describe the value of the process variable as a function of statistical value when the flame is stable or describe the statistical value as a function of the value of the process variable when the flame is stable and generating a stability value indicating a stability of a flame; and a workstation displaying for displaying a graph of the statistical value and a graph of the stability value to visually display when a change in the statistical variable is associated with a change in the stability value.

19. The apparatus of claim 18 wherein the statistical value for the furnace draft pressure measurement comprises a standard deviation of a furnace draft pressure and the process variable comprises a firing rate of a burner.

* * * * *